Patented Apr. 13, 1937

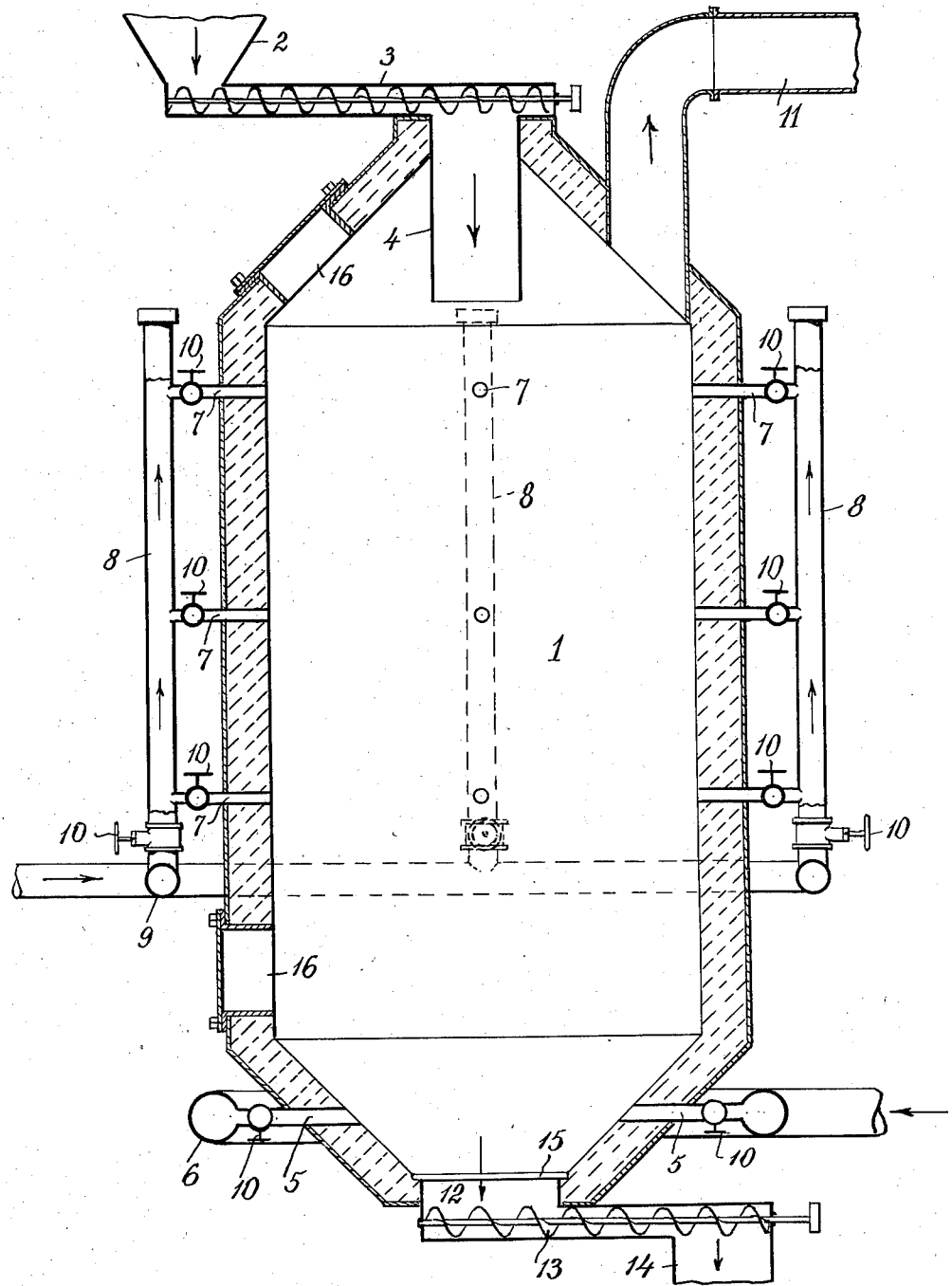

2,077,028

UNITED STATES PATENT OFFICE 2,077,028

RECOVERY OF SULPHUR

Raymond F. Bacon, Bronxville, N. Y., and Wilber Judson, Newgulf, Tex.

Application November 27, 1931, Serial No. 577,582

4 Claims. (Cl. 23—226)

This invention relates to the recovery of sulphur and has for its object an improved method of recovering sulphur from finely divided sulphide ores, flotation concentrates and the like. More particularly, the invention relates to sulphur recovery wherein a suspension or "flash" roasting operation of the fines or flotation concentrates is involved.

In the suspension or "flash" roasting of pyrites fines as ordinarily conducted, numerous operating difficulties have presented themselves which are distinctly detrimental to the effective conduct of the roasting operation. Principal among these are the formation of sintered accretions upon the walls of the roasting furnace, incomplete desulphurization of the pyrites, and the too rapid burning out of the furnace. The formation of accretions is of quite common occurrence and is particularly objectionable, for the accretions assume such substantial and obstructing proportions in a short time that the operation of the furnace must be suspended at all too frequent intervals to permit their being broken away from the furnace walls. This breaking away of the large masses of accretion, moreover, involves considerable wear and tear upon the furnace, and in addition results in the waste of material amounts of green or undesulphurized pyrites which is frequently enclosed in the accretions.

Our investigations of this problem indicate that the objectionable accretions resulting from sintering, the incomplete desulphurization attendant thereupon, the rapid burning out of the furnace, and in some cases slagging of the furnace lining with the oxidized pyrites, are in large part ascribable to the excessively high temperature which results in the usual flash roasting.

Pyrites is highly combustible even in lump form, and with the large surface area presented to the oxidizing gas in the suspension or flash roasting of fines, the oxidation, with its accompanying production of heat, proceeds with such intensity and rapidity that a very high local temperature results. As a consequence of this excessively high temperature, which because of the intensity and rapidity of the action is difficult to control, there will be a natural tendency to burn out the furnace relatively quickly, and material quantities of the pyrites will be sintered and form accretions upon the walls before complete desulphurization has taken place.

By the method of our invention a highly effective and economical operation is provided whereby the aforenoted difficulties are overcome and at the same time a substantial recovery of elemental sulphur is made possible. This we accomplish primarily by conducting the flash roasting operation in the presence of a reagent which reacts endothermically with the pyrites, and more particularly with a reagent which yields a sulphur compound reactable with sulphur dioxide to form elemental sulphur. These functions are economically and efficiently served by steam, which reacts endothermically with pyrites to form hydrogen sulphide, a sulphur compound quite reactable with sulphur dioxide to form sulphur. As a result of the endothermic nature of the reaction between the steam and the pyrites, the reaction serves very effectively as a means of control to keep the temperature of the pyrites being roasted below the sintering point, and the attendant effects serve to very materially enhance the recovery of elemental sulphur.

In the accompanying drawing an illustrative apparatus is shown by means of which the method of our invention may be carried out.

Reference numeral 1 designates a roasting furnace, constructed of firebrick or other suitable refractory and non-corrodible material, in suitable insulating thickness, into which the fines or flotation concentrates are introduced by means of a regulatable feed, in the illustration shown comprising a hopper 2 and screw conveyer 3 leading to the inlet duct 4. Tuyères 5 are provided in the lower part of the furnace for the introduction of the air or other oxidizing gas, which tuyères communicate with a feed pipe 6 connecting with a suitable fan blower (not shown).

Tuyères 7, for the introduction of the steam, are disposed at suitable points in the furnace walls, each tuyère communicating with a vertical duct 8 leading to the feed pipe 9 communicating with the steam supply. Suitable valves 10 are provided in the various tuyères and pipes as necessary or desired.

Exit flue 11 provides for the discharge of the gases from the furnace and a cinder pit 12, screw conveyer 13 and cinder outlet 14 at the bottom of the furnace, protected by a grate 15, provide for the discharge of the solid cinder. The usual work holes 16 for the observation of and access to the interior of the furnace are disposed at desired points.

An illustrative mode of operation of the method of our invention is as follows: The interior of the furnace 1 is first preheated to a temperature at which the pyrites will be ignited, for example 850° C., and this may be accomplished by the insertion of oil burners through the work holes 16, or in other suitable manner. Upon the completion of the preheating the flow of pyrites fines is then started through the inlet 4 by the action of the feeding device 3, and a countercurrent of air or other equivalent oxidizing gas is initiated at suitable velocity through the tuyères 5. The air, and likewise the pyrites, may be preheated if desired and, further, the air may be enriched in oxygen to intensify its oxidizing action. Upon the contact of the oxidizing gas with the fine shower of pyrites, an intense oxidation of the pyrites takes place, with the ultimate production of iron oxide and sulphur dioxide.

In the usual suspension roasting of the fines the intense heat will, as has been noted, generally result in the sintering of portions of the pyrites being roasted and the gradual accumulation of accretions upon the walls of the furnace. This tendency appears to be particularly manifested by the pyrites in a certain phase of its transition from the disulphide to the oxide state, for practical purposes at what might be considered to correspond roughly to the monosulphide. When a quantity of iron oxide is present however, the tendency appears to be appreciably inhibited. As a consequence the formation of accretions tends to be more or less confined to a fairly restricted zone in the roasting furnace rather than to occur uniformly throughout the same. The particular location of this sintering zone will of course vary with the particular operation, being influenced by the particular rates of flow of the pyrites and air, the specific temperature conditions existing in the chamber, etc. When the particular operation is running with a suitable degree of uniformity however, the variation in the occurrence of the major sintering will not be very great. This confinement of the sintering to only a portion of the furnace and the absence of any very substantial change in location with uniform operating conditions, appreciably facilitates the control of the sintering by the use of the steam of our method.

Accordingly, when the roasting operation is proceeding satisfactorily, steam at a suitable temperature and in adequate quantity is introduced through the tuyères 7 at such points at the particular operation may indicate to be most advantageous for the suppression of sintering. Steam may, for example, be passed in through the tuyères which will intrdouce it directly into the zone where the sintering tendency is most marked, or it may be introduced below the sintering zone and advanced thereinto with the air current, or both modes of introduction may be resorted to. Under some circumstances moreover, it may prove advantageous to introduce the steam in concurrent flow with the pyrites, either as a supplement to its introduction in the other parts of the chamber or as a sole source. The initial temperature at which the transitional sintering form of the pyrites being roasted appears to most strongly incline towards sintering, is approximately 850–900° C. and accordingly the steam should be introduced in such quantity and at suitable points to assure that the temperature in the sintering zone is maintained below such temperature. The endothermic nature of the reaction of the steam with the iron sulphide to form hydrogen sulphide and iron oxide is rather pronounced and as a consequence it provides a quite satisfactory counterbalancing action against the excessive temperature effects of the strongly exothermic roasting reaction. By suitable regulation of the rate of flow and temperature of the steam, selection of the most advantageous points of introduction, etc., a satisfactory practical heat balance between these reactions may be effected which will require only a relatively slight amount of alteration to meet the variations in the sintering conditions which may occur in the subsequent conduct of the operation.

The course of the pyrites in the operation may be roughly traced as follows: In the upper portion of the roasting furnace in a somewhat restricted zone the steam reacts to an extent with the pyrites to yield hydrogen sulphide, and a very appreciable quantity of the volatile or so-called "feeble" atom of sulphur of the pyrites is liberated and discharged without oxidation. This liberation of volatile sulphur and its discharge as such, with consequent enhancement of the sulphur recovery aspects of the operation, is made possible to a considerable extent by the diluent action of the steam, which reduces the concentration of free oxygen in the upper parts of the furnace and thus permits an appreciably larger quantity of the volatile sulphur atom of the pyrites to be distilled off and discharged without oxidation to sulphur dioxide than would ordinarily be the case.

As the pyrites proceeds further down in the furnace it becomes reduced more or less to the approximately monosulphide form, and in the hot oxidizing atmosphere is converted to iron oxide and sulphur dioxide, some of the sulphur dioxide of course being contributed by oxidation of the feeble sulphur atom. The oxidation becomes highly intense as lower portions of the furnace are approached, and under the usual roasting conditions, the temperature quickly tends to exceed the sintering point of the iron sulphide being oxidized, viz. 850°–900° C.

Concurrently with the intense oxidation of the iron sulphide in the present process however, the steam which is being appropriately provided is likewise reacting with iron sulphide to form iron oxide and hydrogen sulphide. This reaction, as has been noted, is distinctly endothermic, and its attendant consumption of heat from the accompanying oxidation reaction will, as a consequence, serve as a means of suppressing the production of excessive temperatures.

More and more iron oxide is formed as the iron passes downwardly through the oxidizing atmosphere, and when the quantity present is sufficient to inhibit sintering, the temperature may be permitted to become elevated accordingly, and ultimately to a very substantial degree, for example 1400° C. Such high temperature facilitates the oxidation of the more recalcitrant small quantity of unoxidized sulphur remaining, and its removal may be further facilitated if desired by the use of oxygen-enriched air, preheating of the air, and the like, inasmuch as the sintering factor has been rendered negligible. Such temperature-elevating effect upon the upper portions of the furnace as this high temperature utilized in the lower zone to assist complete desulphurization may have, can be effectively combatted by the action of the steam in suitable amount in the upper portions of the chamber, and as a consequence the high temperature may be resorted to without substantial concern from a sintering standpoint.

After complete desulphurization the hot iron oxide cinder, either as $Fe_2O_3$ or $Fe_3O_4$ depending upon the particular operating conditions, passes into the cinder pit 12 and from there is conveyed by the conveyer 13 to the cinder outlet 14. The iron oxide obtained is in a very pure form and is well adapted for subsequent blast furnace treatment. Moreover, as discharged from the roasting furnace it is very hot and can be conveniently utilized to preheat the steam, or the air, or both, to which end these gases may be either passed directly through the hot cinder, or in indirect heat-exchanging relationship therewith.

As for the sulphur in the ore, this will pass off through the gas exit 11 in the form of elemental sulphur, hydrogen sulphide and sulphur dioxide, together with the nitrogen from the air and some steam, the relative proportions of the gases varying of course with the operating conditions.

Inasmuch as the roasting operation is directed to the treatment of finely divided material, the exit gases will carry entrained therewith a quantity of dust which it is desirable to remove before proceeding further with the treatment of the gases. This removal may be accomplished in any suitable manner, for example, by the use of a mechanical baffle chamber, or chambers, electrostatic precipitation means, or both.

After such operation the dust-free gases are then in condition for further treatment to recover elemental sulphur from the sulphur compounds therein. Some of the sulphur is already present in elemental form, and to the extent that they are present in reacting proportions the hydrogen sulphide and sulphur dioxide may be reacted to provide an additional quantity of sulphur. For such amount of sulphur dioxide or hydrogen sulphide as is in excess of the other, a suitable quantity of hydrogen sulphide or sulphur dioxide respectively may be added from other sources if desired.

In our preferred method of recovering elemental sulphur from these gases, they are conducted from the dust collector into a catalytic chamber containing bauxite or other catalyst which will accelerate the reaction between hydrogen sulphide and sulphur dioxide. The temperature in the catalytic chamber is desirably maintained in the neighborhood of 300° C., and the maintenance of such temperature will be aided by the fact that the gases introduced therein are already quite hot. Upon discharge from the roasting furnace the gases are at a temperature of approximately 350-450° C. and while some radiation loss may occur in their passage through the dust collecting system, any necessary heat addition for the subsequent catalytic treatment will not be great. At approximately 300° C. the reaction in the catalytic chamber proceeds very effectively and deposition of sulphur upon the catalyst is avoided. While the gases also contain water vapor, its presence is of advantage rather than the contrary for in itself it exerts a catalytic effect upon the sulphur producing reaction.

The effluent gases from the catalytic chamber containing the sulphur and water vapor are then treated to condense and collect the sulphur. This may be accomplished, for example, by passing the gases through a waste heat boiler, either alone or supplemented by a subsequent electrostatic precipitator, by means of which the elemental sulphur may be substantially completely condensed and collected. As for the water vapor in the gases, it may be either condensed with the sulphur and the sulphur thereafter separated therefrom or selective condensation may be utilized by maintaining the temperature of the condensation operation below the condensation point of the sulphur but above that of the water vapor.

While the illustrative operation has been described in particular relationship to pyrites fines or flotation concentrates, the method of our invention is likewise effectively applicable in the roasting of other finely divided metal sulphide materials, such for example as pyrrhotite, chalcopyrite, chalcocite, sphalerite, and the like, and is utilizable as a means of controlling the temperature of the roasting operation and the production of sulphur compounds where sintering problems are not involved.

We claim:

1. In a sulphur recovery process in which metal sulphide is subjected to the action of an oxidizing gas in a suitable roasting furnace, while the metal sulphide and gas pass through the furnace in counter-current flow, to convert the metal sulphide substantially completely to iron oxide and produce sulphur dioxide while the metal sulphide is in suspension in the oxidizing gas, the improvement which comprises introducing into the roasting furnace an agent which reacts with metal sulphide to form a product reactable with sulphur dioxide to form elemental sulphur, said agent being introduced into reacting relationship with the metal sulphide to effect a reaction between the agent and the metal sulphide, whereby the development of undesirably high temperatures in the zone of oxidation of the metal sulphide is prevented.

2. In a sulphur recovery process in which metal sulphide is subjected to the action of an oxidizing gas in a suitable roasting furnace, while the metal sulphide and gas pass through the furnace in counter-current flow, to convert the metal sulphide substantially completely to iron oxide and produce sulphur dioxide while the metal sulphide is in suspension in the oxidizing gas, the improvement which comprises introducing into the roasting furnace an agent which reacts endothermically with metal sulphide to form a product reactable with sulphur dioxide to form elemental sulphur, said agent being introduced into reacting relationship with the metal sulphide to effect a reaction between the agent and the metal sulphide, whereby the development of undesirably high temperatures in the zone of oxidation of the metal sulphide is prevented.

3. In a sulphur recovery process in which metal sulphide is subjected to the action of an oxidizing gas in a suitable roasting furnace, while the metal sulphide and gas pass through the furnace in counter-current flow, to convert the metal sulphide substantially completely to iron oxide and produce sulphur dioxide while the metal sulphide is in suspension in the oxidizing gas, the improvement which comprises introducing water vapor into the roasting furnace in suitable amount to produce hydrogen sulphide and maintain a non-sintering temperature in that zone in which the sulphide being roasted is in sinterable form, the water vapor being introduced into reacting relationship with the metal sulphide to effect a reaction between the water vapor and the metal sulphide, whereby a non-sintering temperature is maintained in the zone in which the sulphide is in sinterable form while roasting of the metal sulphide therein proceeds.

4. In a sulphur recovery process in which pyrites is subjected to a distilling treatment in a suitable furnace while in suspension in a countercurrently flowing stream of gas, and the iron sulphide product of the distilling treatment is subjected to the action of an oxidizing gas in the same furnace to convert the iron sulphide substantially completely to iron oxide and produce sulphur dioxide while the iron sulphide is in suspension in the oxidizing gas, the improvement which comprises introducing a diluent gas endothermically reactive with the pyrites into that portion of the furnace wherein the feeble sulphur atom of the pyrites is being distilled, whereby the concentration of the oxidizing gas is reduced and an increase in the amount of unoxidized feeble sulphur is obtained.

RAYMOND F. BACON.
WILBER JUDSON.